June 1, 1948.  M. M. ROENSCH  2,442,664
DIESEL ENGINE

Filed March 16, 1945  2 Sheets-Sheet 1

INVENTORS.
Max M. Roensch,
BY
Harness & Harris
ATTORNEYS.

June 1, 1948.  M. M. ROENSCH  2,442,664
DIESEL ENGINE
Filed March 16, 1945  2 Sheets—Sheet 2
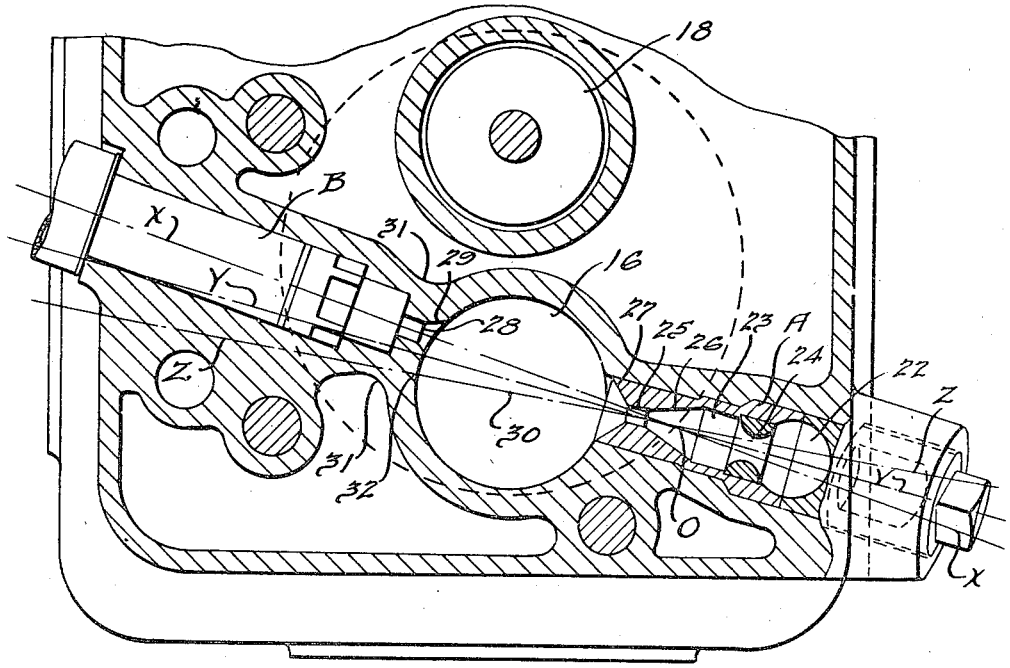
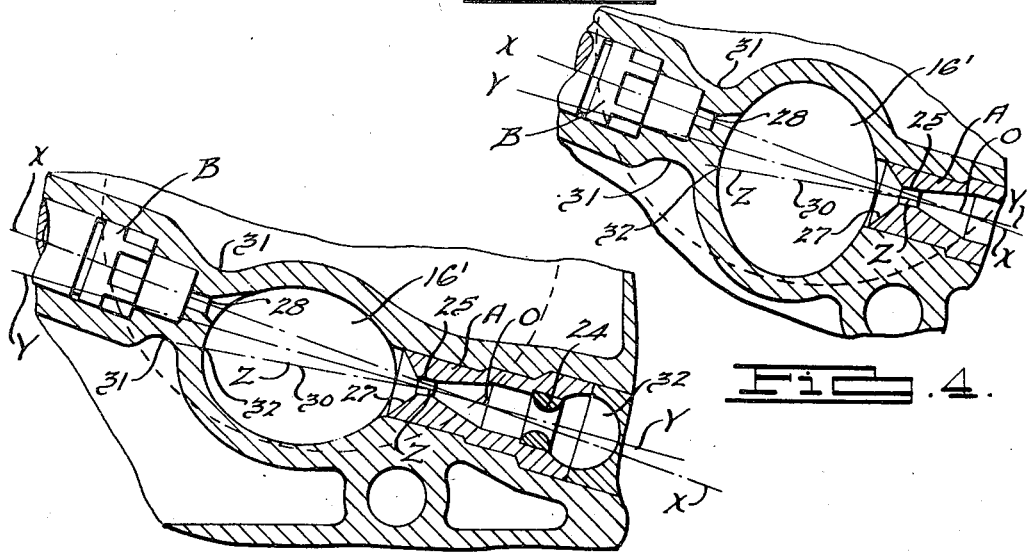
INVENTOR.
Max M. Roensch.
BY
Harness & Harris
ATTORNEYS.

Patented June 1, 1948

2,442,664

UNITED STATES PATENT OFFICE 2,442,664

DIESEL ENGINE

Max M. Roensch, Birmingham, Mich., assignor to Chrysler Corporation, Highland Park, Mich., a corporation of Delaware Application March 16, 1945, Serial No. 583,063

1 Claim. (Cl. 123—32)

This invention relates to the Diesel or fuel injection class of internal combustion engines and refers more particularly to engines of this type which employ an auxiliary combustion chamber or cell wherein relatively high combustion pressures are developed for high velocity ejection of the combustion products into the main combustion chamber in which peak pressure is substantially less than that in the cell. This type of engine has been the subject of much development in the Diesel art and offers advantage over other types especially with reference to automotive power installations where flexibility of load control and fuel economy are concerned.

In engines of the auxiliary combustion cell type, it is recognized to be desirable to provide the cell with an orifice defining a restricted communication between the cell and main combustion chamber, the orifice leading to the main chamber by a funnel passageway. The main chamber is arranged to overlie only a portion of the piston face, the cylinder head being brought into minimum clearance relationship with the remainder of the piston face. The fuel injection nozzle is usually positioned to direct the fuel spray into the main combustion chamber generally toward the funnel passageway of the cell. In many instances the cell operates as an air storage chamber instead of as an auxiliary combustion chamber but the air chamber type of engine is inferior in many respects to the auxiliary combustion chamber type to which my improvements are directed.

It is an object of my invention to provide improvements in a Diesel engine of the aforesaid auxiliary combustion chamber type such that, while retaining the aforesaid desirable relationship of parts in general, my engine will provide improved fuel economy, less tendency toward smoky exhaust over the load range, improved mixing of the fuel and air, improved combustion characteristics, and a generally better overall operating efficiency of the engine.

A further object is to provide a Diesel engine of the aforesaid type which, in addition to the aforesaid improvements, provides for improved protection of the tip of the fuel injection nozzle against burning and carbonizing by the action of the incandescent gases discharged at high velocity from the cell.

It has been heretofore recognized as being desirable to so arrange the cell that the core or axis of the stream issuing therefrom will not be directly aligned with or directly aimed at the tip of the fuel injection nozzle but in such prior arrangements the desired effect has been attained only to a limited extent and at a sacrifice of other desired characteristics. Where, for example, the cell axis has been angled with respect to the axis of the fuel injection stream the resulting arrangement is objectionable in that it causes the fuel stream axis to impinge too far away from the cell orifice to insure the necessary quantity of fuel from injection entry into the cell and also upsets the desired turbulence balance of the fuel and air in the combustion chamber and undesirably limits the extent to which the axis of the stream issuing from the cell may be directed away from the injection nozzle tip.

My invention teaches an improved arrangement of engine parts whereby the core or axis of the stream issuing from the cell may be directed more remotely from the tip of the injection nozzle than has heretofore been possible without unduly sacrificing other desirable characteristics.

In carrying out my invention, I not only incline the cell axis relative to the nozzle axis but I also incline the axis of the orifice in predetermined relationship with respect to the axes of the cell and nozzle so that the axis of the stream issuing from the cell impinges against the combustion chamber wall at a region well removed from the tip of the fuel injection nozzle and at a region which may be readily cooled sufficiently to avoid destructive action on the nozzle parts. I have furthermore provided a novel relationship of parts so arranged that a concentrated jet of fuel ejected by the nozzle has its core or axis directed to pass preferably into the cell orifice or closely adjacent the intersection of the cell orifice with the cell funnel thereby to insure the desired quantity of fuel entering the cell. In addition, the arrangement is preferably such that the high velocity stream from the cell will not promote appreciable rotary turbulence in the main combustion chamber. Rotary turbulence tends to produce an unbalanced turbulence condition in which the heavier particles of the fuel and air are thrown outwardly resulting in a non-uniform or unbalanced mixture. Rotary turbulence furthermore tends to produce smoky exhaust, inefficient combustion, and localized excessively heated areas or regions at the boundary portions of the main combustion chamber. In my invention the combustion chamber walls are substantially symmetrically arranged with respect to the axis of the stream from the cell orifice whereby the fuel and air is effectively mixed or churned with approximate uniformity without any definitely defined rotary swirl such as has been advocated heretofore about an axis of the combustion chamber.

Additional features of my invention in its more limited aspects relate to the particular relationship of the various engine parts as more particularly hereinafter described, reference being had to the accompanying drawings in which:

Fig. 2 is a sectional top plan view taken as indicated by the line 2—2 of Fig. 1.

Fig. 3 is a view similar to a portion of Fig. 2 illustrating a slightly modified shape of combustion chamber.

Fig. 4 is a view similar to Fig. 2 illustrating a further modified shape of combustion chamber.

Figure 1:
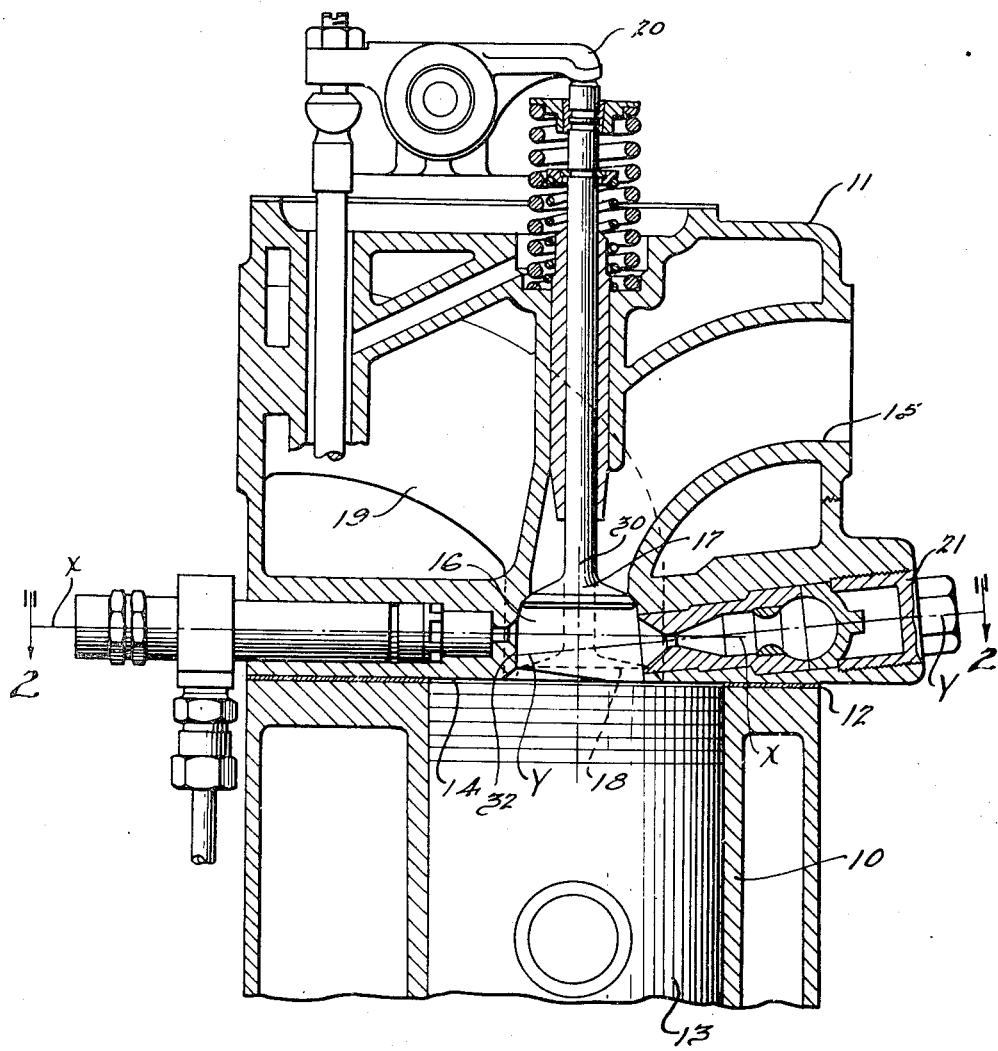
Fig. 1 is a sectional elevational view through a typical cylinder of my engine, illustrating the cylinder head and associated parts thereof embodying my invention.

In the drawings my engine embodies a cylinder 10 having its outer end closed by the head structure 11 secured in position by the usual bolts with an intervening gasket 12. Piston 13 operates in the cylinder and is shown at top dead center position in Fig. 1 for maximum compression at which time a clearance space 14 of approximately the thickness of the gasket 12 is provided between the piston and underface of the head at regions other than at the main combustion chamber.

The head 11 is provided with an air intake passage 15 for the main combustion chamber 16, the entry of air to chamber 16 being controlled by intake valve 17 so as to admit air to the chamber during the suction stroke of the piston for a four-stroke cycle engine. Exhaust valve 18 controls passage of exhaust gases from the chamber 16 and cylinder 10, subsequently to the working stroke of the piston, through an exhaust passage 19. Any suitable well known valve mechanism 20 may be provided for timed operation of the valves. In my invention the desirable positioning of the stems of valves 17 and 18 parallel to each other and in a vertical plane containing the axis of the cylinder and piston contributes to the attainment of a symmetrically shaped combustion chamber for uniformity or balance in the fuel and air mixture in chamber 16.

The combustion chamber 16 is preferably of approximately uniform height and is of circular shape in planes normal to the cylinder axis in the embodiment illustrated in Fig. 2 while in Figs. 3 and 4 the combustion chamber 16' is of approximate elliptical shape in such planes. The combustion chamber overlies and opens directly downwardly into cylinder 10 adjacent one side thereof below valve 17, and passage 19 overlies and opens downwardly directly into cylinder 10 adjacent the opposite side.

The cylinder head 11 is provided with an auxiliary combustion chamber or combustion cell which, as a whole, is designated at A and may have one or more combustion chambers, the assembly A being retained in position by the threaded member 21. In the illustration the cell A by preference comprises an outer combustion chamber portion 22 and an inner combustion chamber portion 23 connected by an outer orifice 24 of relatively large cross sectional area with respect to an inner orifice 25. Chamber portion 23 tapers inwardly at 26 to merge with a cylindrical orifice 25 at the outer margin of the latter. The cell A is further provided with a funnel-like passage 27 which flares inwardly from the inner margin of orifice 25 to merge with the side wall of chamber 16 at a region generally opposite to the location in head 11 of a fuel injection nozzle B having its injection ported tip 28 arranged to inject fuel in a concentrated high pressure stream through the combustion chamber wall opening 29.

Nozzle B has its axis X—X coincident with the line or axis of the concentrated fuel stream which is ejected from the tip 28, this axis preferably passing through the orifice 25, or at least contiguous to the inner peripheral boundary of orifice 25, such that fuel from the nozzle will be injected directly into the cell chambers 22 and 23 in sufficient quantity while portions of the fuel stream surrounding its core will mix with the air in chamber 16 and other portions closely adjacent the stream axis X—X will strike the funnel 27 and be deflected into the cell.

The cell A is tipped so that it has its axis Y—Y inclined relative to axis X—X both horizontally as viewed in Fig. 2 and vertically as viewed in Fig. 1, these axes being shown as intersecting at O outwardly of the orifice 25 and within the cell chamber 23. All portions of cell A including funnel 27 but excluding orifice 25 have their axes coincident with the cell axis Y—Y, the orifice 25 having its axis Z—Z inclined horizontally relative to axes X—X and Y—Y so that the axis Y—Y is disposed intermediate the axes X—X and Z—Z and intersects axis X—X approximately at the point O. Axis Z—Z preferably has the same inclination vertically as that of axis Y—Y so that it would lie in a plane containing axis Y—Y perpendicular to the plane of the paper of Fig. 1.

The orifice 25, in a measure because of its cylindrical form, controls the direction of the jet issuing from cell A into and across chamber 16, the core or axis of such jet being coincident with axis Z—Z which intersects the vertical axis 30 of symmetry of the circular chamber 16 or chamber 16' so that the stream from the cell in impinging on the combustion chamber wall has no decided tendency to induce either clockwise or counter-clockwise rotary turbulence in chamber 16 but rather produces a uniform or balanced turbulence or churning of the fuel and air in chamber 16 thereby maintaining the charge uniform for efficient combustion free to an improved degree from objectionable exhaust smoke.

It will be observed that the axis of the stream from cell A is not directed toward the nozzle tip 28 but rather to a region 32 of the wall of chamber 16 well removed from this tip where efficient cooling at water chamber 31 will carry away the heat induced by the impinging action of the cell jet on the cylinder wall portion 32 and thereby protect the nozzle and parts thereof from overheating and carbonizing as a result of the incandescent gaseous stream ejected at high velocity from cell A.

The intersection of orifice axis Z—Z with the wall portion 32 of chamber 16 is further removed from the nozzle tip 28, by reason of my invention, than would be possible as a practicable matter by merely inclining the axis of the entire cell as a unit in a vertical direction as viewed in Fig. 1 for example. By also tilting the cell horizontally relative to axis X—X and, in addition, further tilting or angling the cell discharge orifice 25, it will be apparent that the final net effect is to direct the cell stream to region 32 which is sufficiently well removed from proximity with nozzle tip 28 to accomplish the desired objects.

Of considerable importance is the relationship of the main combustion chamber 16 substantially symmetrically relative to the cell stream axis Z—Z, it being noted that the portion of axis Z—Z across chamber 16 is contained in a vertical plane including diameters of the walls forming chamber 16. Likewise in Figs. 3 and 4 the portion of axis Z—Z across chamber 16' is contained in a vertical plane including either the major axis (Fig. 3) or the minor axis (Fig. 4) of the generally elliptical shaped combustion chamber 16' so that there will not be appreciable tendency for the cell ejected stream to set up a defined rotary turbulence around the vertical axis 30 of symmetry of chamber 16'. The Fig. 3 and Fig 4 arrangements are otherwise just as set forth for the circular chamber of Figs. 1 and 2, the only difference being in the shape of the combustion chamber as viewed in plan. For relatively large size engines, the Fig. 4 arrangement is desirable as it accommodates itself to increasing the volume of the main combustion chamber while approximately maintaining the distance between the nozzle tip 28 and orifice 25.

With my arrangement the nozzle tip 28 is disposed, in relation to the cell A, for travel of the injected fuel stream across chamber 16 for substantially the distance of a diameter such that there is substantially no tendency for inducing rotary swirl in chamber 16 by reason of the injected fuel stream as would result if nozzle axis X—X was disposed generally tangential of chamber 16. In fact, with the parts arranged as illustrated, portions of the nozzle tip and cell lie at the ends of a diameter or horizontal line through axis 30 in each of Figs. 2 and 3. The increment of inclination of axes Y—Y and Z—Z relative to axis X—X is in the order of 7° as shown in my drawings.

During the upward compression stroke of the piston the air, previously admitted by valve 17, is highly compressed into chamber 16 and through orifice 25 into the cell chambers 22 and 23, the compression increasing as the piston approaches its top dead center position of Fig. 1. Because of the slight restriction at orifice 25 the air pressure rises somewhat slower in the cell chambers than in the chamber 16. However, as the piston nears its outermost position injection of fuel along axis X—X takes place in a concentrated sprayed stream in the shape of a cone with a dispersion angle so proportioned that a fuel spray of minute fuel oil particles will form a rich slow burning fuel-air mixture in the chamber 16 whereas, the core of the stream spray being directed at orifice 25, sufficient fuel penetrates the cell chambers 23 and 22 in the proper amount to form therein a quick burning fuel-air mixture.

Fuel injection, except for fuel line surge effects, takes place under typical operating load conditions while the piston is moving outwardly on compression, as from about 16° before top dead center to about 4° before top dead center and about the time of fuel cut-off the rich fuel-air mixture in chamber 16 is ignited by the heat of the compressed air and burns relatively slowly. At about top dead center position of the piston, the quick burning mixture in the cell chambers 22 and 23 becomes ignited either by reason of the temperature of the air in the cell chambers or by flame propagation from chamber 16 or both. Because of the very rapid combustion in the cell chambers and their relatively small volume, the pressure in the cell chambers rises almost instantly considerably above the pressure in chamber 16 causing a high pressure high velocity stream or jet of incandescent gases to be ejected blast-like through orifice 25 back into chamber 16 along axis Z—Z as the piston starts its inward working stroke. This cell stream impinges against the wall of chamber 16 opposite the cell at region 32 remote from the nozzle tip 28 with the aforesaid advantages. The blast stream from cell orifice 25 acts effectively to disperse the residual rich fuel-air mixture and quickly and thoroughly provide a balanced uniform efficiently burning mixture throughout the chamber 16. Rotary turbulene is avoided because, although the cell A is tilted horizontally from the nozzle axis Z—Z, the combustion chamber is symmetrically shaped about the axis of the orifice and the blast stream has no tendency to set up high velocity rotary swirling about the vertical axis of the chamber 16 so that the wet fuel particles are not thrown outwardly from the air against the chamber walls but are instead churned and thoroughly mixed with the air. The same operational characteristics are obtained with the chambers of Figs. 3 and 4.

If desired, other shapes of combustion chambers may obviously be provided within keeping of the principles of my invention and without departing from these principles. Likewise deviations in the relationship of the parts and axes as defined may be made within the scope of the appended claim inasmuch as the arrangement shown, although preferred, has been specifically described in order to illustrate the principles of my invention.

I claim:

In an engine of the fuel injection self-igniting type, a cylinder and a piston operating therein, a cylinder head for the upper end of said cylinder formed with a main combustion chamber disposed to one side of said cylinder and opening downwardly directly to said cylinder, a cell structure carried by said cylinder head and provided with an auxiliary combustion chamber opening into said main combustion chamber at one side thereof through a restricted orifice and a funnel-like passage flaring increasingly from said orifice inwardly to merge with the side walls of said combustion chamber, and a fuel injection nozzle carried by said cylinder head at one side thereof generally opposite said cell structure and having an injection nozzle disposed to inject a stream of fuel into and transversely across said main combustion chamber for entry through said funnel-like passage and orifice to said auxiliary combustion chamber for combustion therein, said injection nozzle arranged to inject a fuel stream the axis of which is directed toward said funnel-like passage, the funnel-like passage and said auxiliary combustion chamber being coaxial with their common axis inclined relative to the axis of the fuel stream downwardly across the main combustion chamber and laterally to one side thereof, the axis of said orifice being inclined relative to the axis of the fuel stream downwardly to approximately the same extent as that of said common axis and laterally of the fuel stream axis to a greater extent and to the same side as that of said common axis whereby a stream of high velocity fluid is directed from said auxiliary chamber along the axis of said orifice for impinging the fluid stream on the wall of the main combustion chamber at a region thereof disposed below and to one side of the tip of said injection nozzle, the wall of said main combustion chamber curving substantially uniformly in opposite directions from said wall region toward said funnel-like passage about a vertical axis of symmetry of the main combustion chamber, said axis of symmetry being so disposed as to approximately intersect the axis of the high velocity fluid stream, said nozzle being so disposed that said fuel stream axis extends between said intersection and the bounding wall portion of said combustion chamber which lies intermediate said nozzle and funnel, said fuel stream axis extending closer to said intersection than to such wall portion, the axis of said fuel stream being so directed as to enter said orifice and intersect the axis of said funnel-like passage outwardly of said orifice from said main combustion chamber such that fuel particles in the core of said ejected fuel stream pass unobstructedly directly through said orifice and into said auxiliary combustion chamber.

MAX M. ROENSCH.

REFERENCES CITED

The following references are of record in the file of this patent:

UNITED STATES PATENTS

| Number | Name | Date |
| --- | --- | --- |
| 2,067,461 | Ramsey | Jan. 12, 1937 |
| 2,103,423 | Lang | Dec. 28, 1937 |
| 2,157,659 | Fischer | May 9, 1939 |
| 2,208,631 | Dietrich | July 23, 1940 |
| 2,267,418 | Oldberg et al. | Dec. 23, 1941 |
| 2,281,685 | Fischer | May 5, 1942 |

FOREIGN PATENTS

| Number | Country | Date |
| --- | --- | --- |
| 358,416 | England | Oct. 8, 1931 |